United States Patent [19]
Taylor, Jr.

[11] Patent Number: 6,147,855
[45] Date of Patent: Nov. 14, 2000

[54] VARIABLE CAPACITOR

[75] Inventor: William N. Taylor, Jr., Dublin, Calif.

[73] Assignee: Applied Materials, Inc., Santa Clara, Calif.

[21] Appl. No.: 08/885,328

[22] Filed: Jun. 30, 1997

Related U.S. Application Data

[63] Continuation of application No. 08/430,906, Apr. 27, 1995, abandoned.

[51] Int. Cl.[7] ................................ H01G 5/00; H01G 5/04
[52] U.S. Cl. ...................... 361/277; 361/278; 361/283.2; 361/290; 361/292
[58] Field of Search ..................................... 361/277, 278, 361/281, 283.2, 283.4, 287, 290, 292, 296, 297, 299.4, 298.3, 298.4, 299.5, 288, 300

[56] References Cited

U.S. PATENT DOCUMENTS

| | | |
|---|---|---|
| 2,712,172 | 7/1955 | Bayha ..................... 29/25.41 |
| 2,745,993 | 5/1956 | Foster . |
| 4,092,579 | 5/1978 | Weit . |
| 4,234,139 | 11/1980 | Porchia . |
| 4,937,694 | 6/1990 | Weber ..................................... 361/280 |

*Primary Examiner*—Hyung-Sub Sough
*Assistant Examiner*—Anthony Dinkins
*Attorney, Agent, or Firm*—Michael Glenn

[57] ABSTRACT

A variable capacitor that provides a full range of capacitance, while reducing the amount of rotation necessary to effect maximum variation in capacitance, and while eliminating any wear-related deterioration in device performance includes at least two coplanar, electrically isolated sets of parallel electroconductive members so configured as to form a fixed set of capacitor plates, each of which may be separately electrically connected to an electrical circuit. A movable group having at least one member including at least one electroconductive area is positioned parallel to, and spaced from, the fixed set of plates. The movable group is adapted for rotation about an axis perpendicular to a surface plane of the first set of plates to vary an amount by which said movable group overlaps the surface of each of said capacitor plates, and thereby provide variable capacitive coupling between the two isolated electroconductive members that comprise the fixed set of capacitor plates.

17 Claims, 5 Drawing Sheets

VARIABLE CAPACITOR

This is a continuation of application Ser. No. 08/430,906 field Apr. 27, 1995, now abandoned.

BACKGROUND OF THE INVENTION

TECHNICAL FIELD

The invention relates generally to capacitors. More particularly, the invention relates to an improved variable capacitor.

DESCRIPTION OF THE PRIOR ART

It has long been known in the art that the capacitance of a capacitor may be varied by changing the amount of overlap of two or more spaced capacitor plates, for example by rotating one stack of capacitor plates relative to another stack of capacitor plates such that the two sets of plates are more or less intermeshed. Such rotation may be effected by turning a shaft to which one set of plates is affixed, where the axis of the shaft is perpendicular to the plane of the capacitor plates. In this arrangement, maximum capacitance is provided by the capacitor when the two sets of plates substantially overlap each other; and minimum capacitance is provided when the two sets of plates do not overlap each other.

Each set of plates is electrically connected to the circuit in which the capacitor is used. It is necessary to make an electrical connection to the rotatable set of plates through a frame to which the plates and shaft are secured. Because an electrical connection to the rotatable set of plates is made at the point at which the shaft is rotated (e.g. a bearing or friction surface), the accuracy and/or reliability of the capacitor deteriorates over time and with use due to wear. For example, the resistance of the shaft surface and bearing can increase, or the alignment of the two sets of plates may change due to such wear.

FIG. 1 is a perspective view of a prior art variable capacitor 10 that includes a first stack of spaced, parallel plates 14 that are adapted for rotation about a central axis, such that they are more or less intermeshed with a second stack of spaced, parallel plates 12. In known variable capacitors it is typically necessary to rotate the movable set of plates with a shaft 18 over a range of 180° to achieve maximum variation in capacitance.

Prior art variable capacitors are usually arranged to store a charge on the two sets of plates and then transfer the charge to an electrical circuit through an electrical connection provided by a set of terminals. For example, an electrical connection may be provided from the rotation axis of the movable set of plates through bearings and/or a wiper to a frame or other supporting surface. An electrical connection is provided both at a terminal for the fixed plates, and at a terminal for the movable plates. As discussed above, the electrical connection to the movable plates is a mechanical connection that is subject to wear. This can result in the capacitor having inefficient and/or inaccurate charge transfer.

While butterfly-type capacitors are known that capacitively couple a charge between fixed and moving parts to minimize inefficiency that may result from component wear, such capacitors produce approximately one half the capacitance range for the same volume as a standard variable capacitor. It would be a significant advance in the art to provide a variable capacitor that provides equivalent capacitance with increased efficiency, for example by minimizing or eliminating the effects of wear due to rotation of a movable set of capacitor plates.

SUMMARY OF THE INVENTION

The invention provides a variable capacitor that produces a full range of capacitance, while reducing the amount of rotation necessary to effect maximum variation in capacitance, and while completely eliminating any deterioration in device performance due to wear. In the preferred embodiment of the invention, at least two coplanar, electrically isolated sets of parallel electroconductive members are so configured as to form a fixed set of capacitor plates, each of which is separately electrically connected to an electrical circuit. A movable group of at least one member having at least one electrically conductive area is positioned parallel to, and spaced from, the fixed set of plates. The movable group is adapted for rotation about an axis perpendicular to a plane surface of the first set of plates to vary an amount by which said movable group overlaps the surface of each of said capacitor plates. In this way, the movable group provides variable capacitive coupling between the two isolated electroconductive members that comprise the fixed set of capacitor plates. Varied capacitive response is produced by use of different configurations of fixed plates and electroconductive areas of the movable plates, for example by layering stacks of fixed and movable plates.

DETAILED DESCRIPTION OF THE INVENTION

The invention provides a variable capacitor that produces a full range of capacitance, while reducing the amount of rotation necessary to effect maximum variation in capacitance, and while eliminating any deterioration in device performance due to wear at the point of rotation. In the preferred embodiment of the invention, at least two coplanar, electrically isolated sets (e.g. separated by a dielectric, such as air or an insulative support) of parallel electroconductive members are so configured as to form a fixed set of capacitor plates, each of which may be separately electrically connected to an electrical circuit by means of electrical terminals. A movable group of at least one member having at least one electrically conductive area is positioned parallel to, and spaced from, the fixed set of plates. The movable group is adapted for rotation about an axis perpendicular to a surface plane of the first set of plates to vary an amount by which said movable group overlaps the surface plane of each of said capacitor plates, and thereby provide variable capacitive coupling between the two isolated electroconductive members that comprise the fixed set of capacitor plates.

Figure 1:
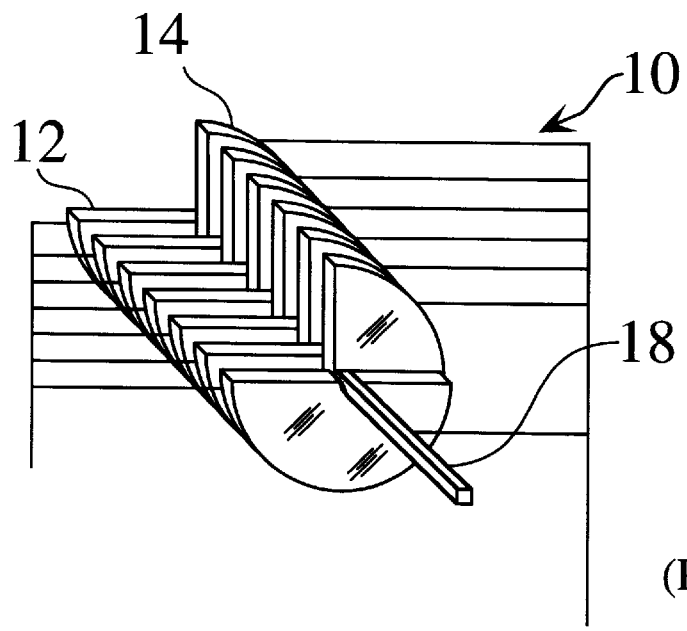
FIG. 1 is a perspective view of a prior art variable capacitor.
Figure 2A:
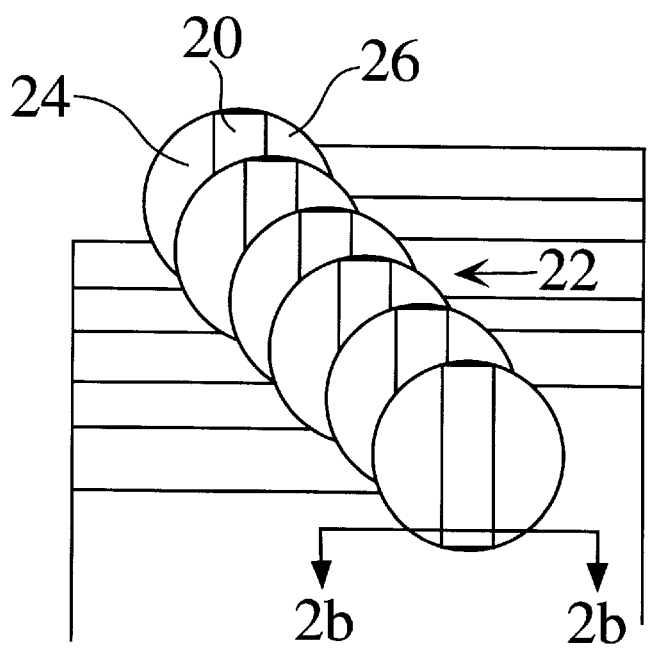
FIG. 2a is a perspective view of a variable capacitor according to the invention.

FIG. 2a is a perspective view of a fixed set of capacitor plates for a variable capacitor according to the invention. In the figure, two sets of coplanar, electrically isolated, electroconductive plates 24, 26 are mechanically joined by conventional methods to form a stack of fixed capacitor plates 22. The plates are electrically isolated from each other by a dielectric material 20. Each individual electroconductive plate may have a surface that is entirely electrically conductive, or may include separate, contiguous, electrically conductive and insulative surface areas. Each electroconductive plate in a set is electrically connected to the other electroconductive plates in the same set, and electrically isolated from electroconductive plates the other set. The fixed sets of plates are preferably co-planar and parallel.

Figure 2B:
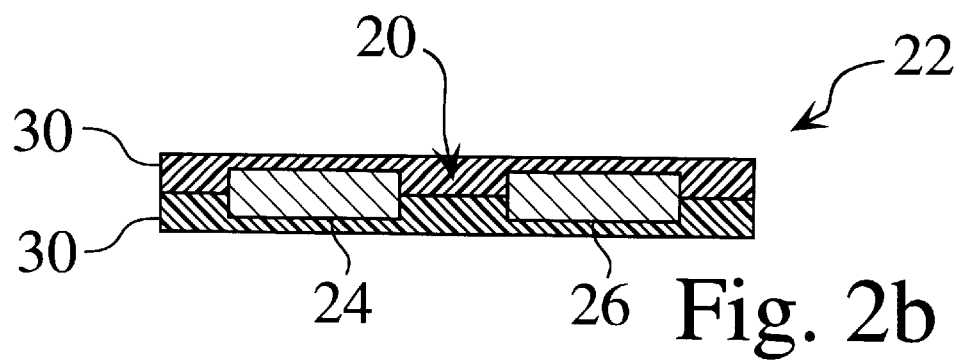
FIG. 2b is a sectional view of a fixed electroconductive plate for the variable capacitor of FIG. 2a according to the invention.

FIG. 2b is a sectional view of a fixed electroconductive plate for the variable capacitor of FIG. 2a according to the invention showing the structure of a fixed electroconductive plate 22. In the preferred embodiment, a copper conductive layer 24, 26 is supported by a dielectric material 30, such as polyimide. The conductive layer may be supported on one side, or on both sides, as shown in FIG. 2b.

The fixed electroconductive plates may have any desired thickness, although the presently preferred range is between about 0.5 and about 5 millimeters, and especially about 2 millimeters. The fixed plates may be formed of any desired electrically conductive and insulative materials. For example, the plates may be formed as patterned electrically conductive areas of a rigid substrate, such as a printed circuit board. The fixed plates may be formed by any one of several known methods, such as by molding, coating a ceramic or plastic substrate, and electroplating.

Although the conductive portion of the plate herein described is made of copper, any other conductive material will provide a suitable conductive material for this purpose, for example, materials such as aluminum, silver, gold, and platinum. Similarly, although polyimide is the presently preferred dielectric/base material, any other material may be used as a base or support, for example, materials such as polymer films, ceramic materials, resinous materials, and plastics.

Figure 3A:
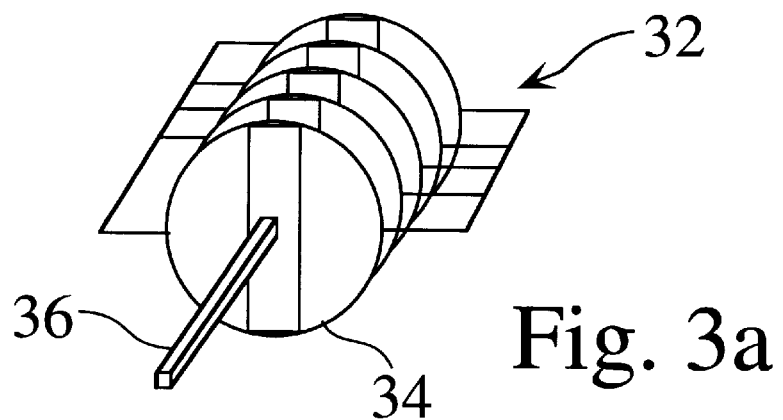
FIG. 3a is a perspective view of a movable group for a variable capacitor according to the invention.

FIG. 3a is a perspective view of a movable group for a variable capacitor according to the invention. The movable group 32 includes at least one movable plate 34 affixed to a shaft 36 and adapted for rotation about the axis of the shaft. The plates of the movable group are oriented parallel to, but in a different plane from, the fixed set of plates. In those embodiments of the invention that include a plurality of fixed and movable plates, the two sets of plates are arranged in stacks that are adapted to more or less intermesh when the movable group is rotated. In the preferred embodiment of the invention, the axis of rotation for the movable group is perpendicular to a surface plane of both fixed plates and the movable plates. In all embodiments of the invention, the movable group is variable, capacitively coupled to the fixed set of plates, and it is not electrically connected to the circuit in which the capacitor is operated.

Figure 3B:
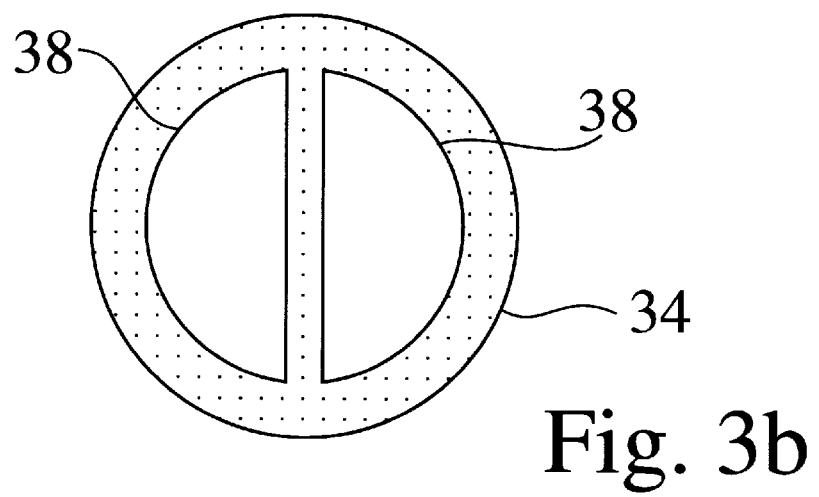
FIG. 3b is an enlarged view of a plate of the movable group shown in FIG. 3a according to the invention.

FIG. 3b is an enlarged view of a plate of the movable group shown in FIG. 3a according to the invention. In FIG. 3b, the plate 34 includes a plurality of isolated electroconductive areas 38, which may optionally be electrically isolated from, or electrically connected to (as shown in FIG. 3a), electrically conductive areas of other plates within the movable group. By providing large conductive areas, the improved variable capacitor disclosed herein exhibits reduced inductance, when compared to prior art capacitors. While the movable plates are preferably formed of copper embedded in ceramic material, other electrically conductive and/or insulative materials may be used to construct the movable plates (see the discussion above). Because the plates are preferably arranged to rotate about a movable axis, they should be sufficiently rigid to remain substantially planar during rotation. Therefore, the movable plates, which are typically only supported at their center at their axis of rotation, should be somewhat thicker than the fixed plates, which may be supported about their edges. In this embodiment of the invention, the preferred movable plate thickness is about 5 millimeters.

In the preferred embodiment of the invention, the plates of the movable group 34 and the plates of the fixed set 22 alternate in a parallel but non-planar orientation. As the movable group is rotated, the electroconductive areas 38 of the plates in the movable group are positioned between the first and second sets of the fixed electroconductive plates, thus creating a capacitive coupling between the otherwise isolated sets of fixed plates. Varied capacitive response is produced by changing the amount by which the movable plates overlap and, in the case of stacked plates, intermesh with, the fixed plates, as well as by use of different configurations of fixed plates and electroconductive areas of the movable plates.

It is thought that maximum overlap of the electroconductive areas of the fixed and movable plates provides maximum capacitance because having a maximum surface area of the movable plate overlie the fixed plate provides a maximum surface area to build up an electrical charge and thereby promotes capacitive coupling. Minimum capacitive coupling occurs when there is minimum overlap of the fixed and movable plates. When there is no such overlap, then only negligible capacitive coupling can occur between the edges of the separated fixed plates. It is preferred to use fixed and movable plates having rounded electroconductive areas, as shown in the figures, because such profile is a more efficient use of the plate surface area, and especially because the percentage of change in capacitance as the movable plate is rotated is more predictable when such electroconductive areas are provided.

Figure 4:
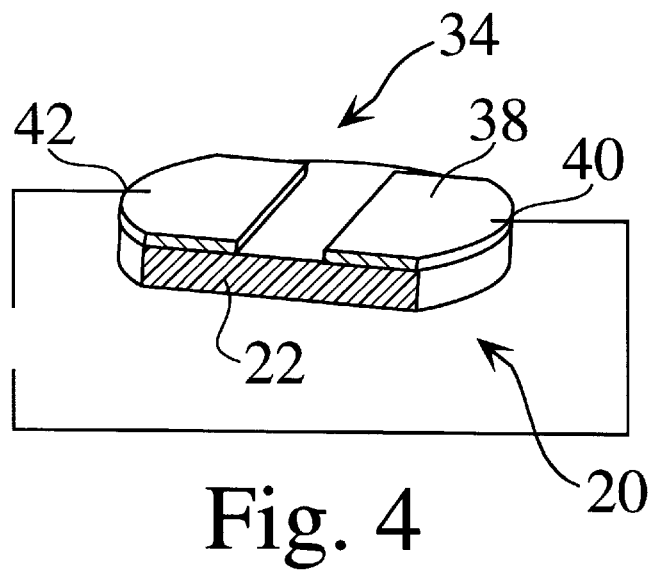
FIG. 4 is an enlarged partially sectioned view of a variable capacitor according to the invention.

FIG. 4 is an enlarged, partially sectioned view of a fixed set of capacitor plates for variable capacitor according to the invention. The fixed set of plates includes a first and a second connection 40, 42 to an electrical circuit, corresponding to the two terminals of the capacitor. Thus, the fixed plates are each electrically connected to a circuit. No electrical connection is provided to the movable group of plates and all current is transferred by capacitive coupling between fixed and moving parts. Thus, there is only a capacitive coupling to the movable group, and there is not therefore an actual electrical connection to the movable group. This eliminates inefficient current transfer and lack of reliability caused by wear to the physical contacts of movable plates in prior art capacitors.

Figure 5A:
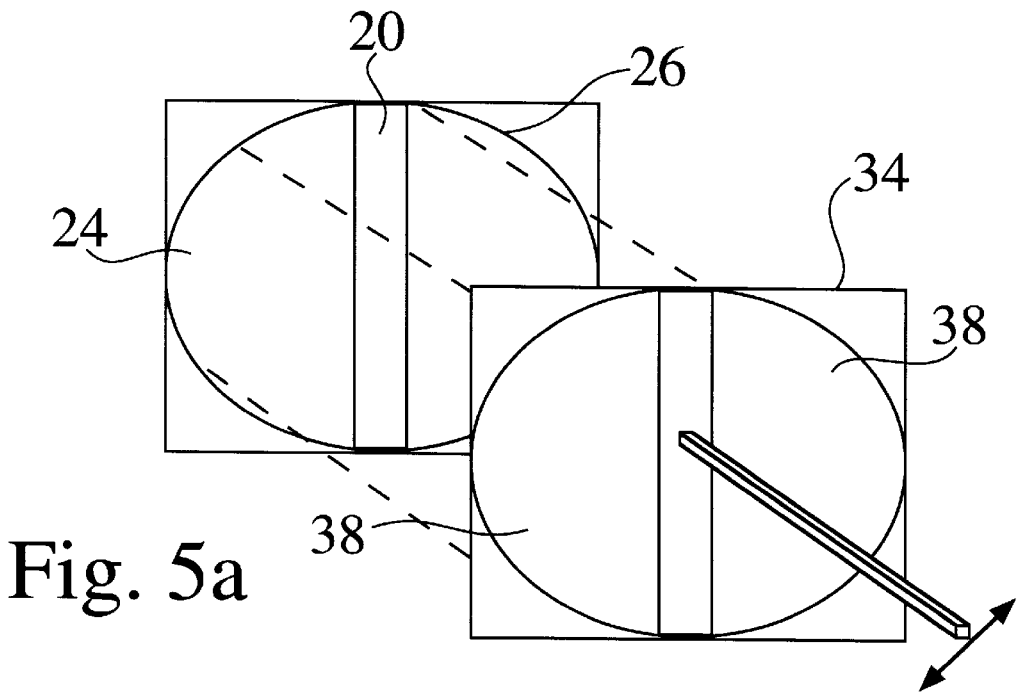
FIGS. 5a and 5b are schematic views of one preferred embodiment of the invention.
Figure 5B:
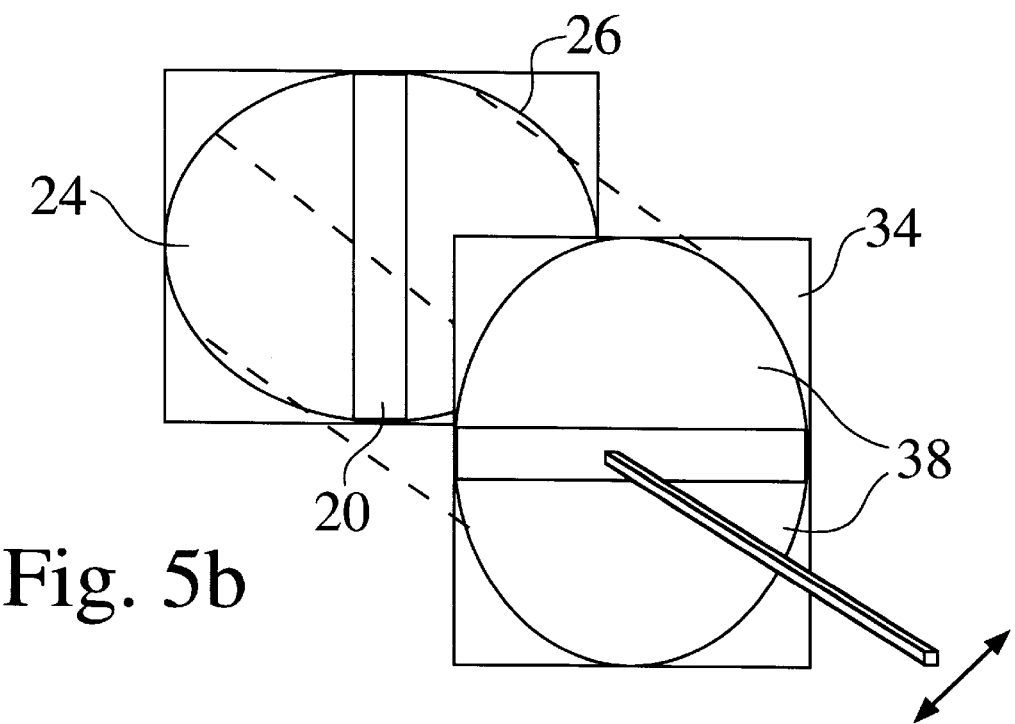

FIGS. 5a and 5b are schematic views of one preferred embodiment of the invention. In FIGS. 5a and 5b, the fixed set is composed of a first set 24 and a second set 26 of electroconductive plates. Maximum variation in capacitance for the preferred embodiment is achieved with a 90° rotation of the plates 38 of the movable group 34 to change the amount by which the movable group overlaps the fixed set, where minimum overlap (FIG. 5a) provides minimum capacitance, and where maximum overlap (FIG. 5b) provides maximum capacitance. In this way, the variable capacitor herein described is distinguished from the prior art capacitor, which require a full 180° of rotation for maximum variation in capacitance.

Figure 6:
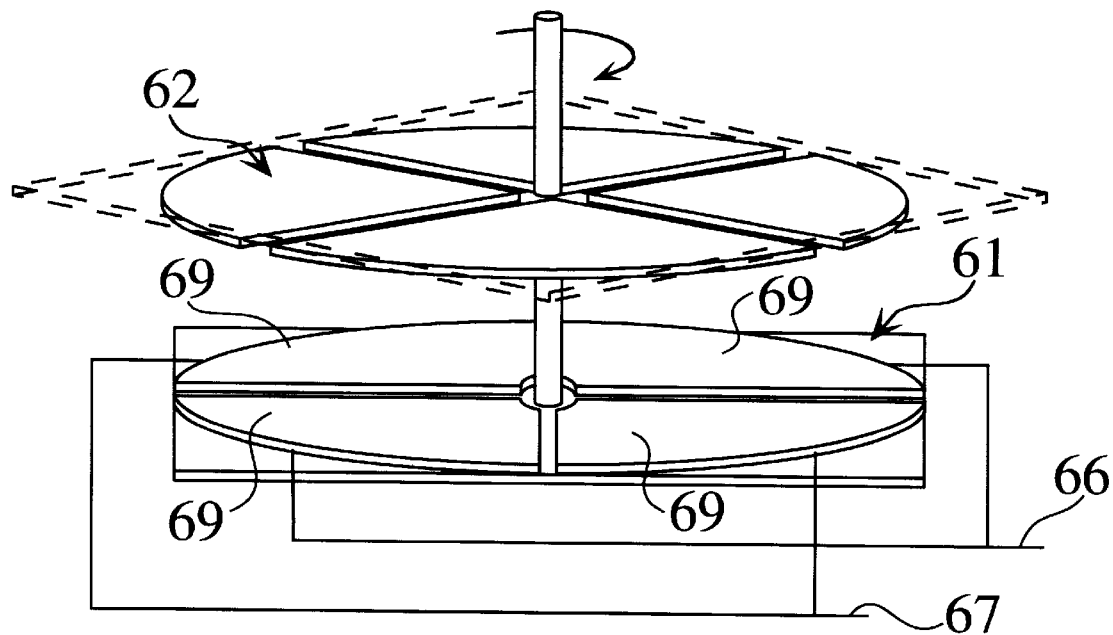
FIG. 6 is a schematic view of another preferred embodiment of the invention.

FIG. 6 is a partially sectioned, schematic view of another preferred embodiment of the invention, including a fixed set 61 and a movable group 62, each of which is formed of four separate sets of electroconductive plates, e.g. the plates 69 shown for the fixed group (but not shown for the movable group: such electroconductive plates are complementary to those of the fixed set). The various plates in the fixed group are interconnected, for example as shown in FIG. 6, to provide connection 66, 67 from the capacitor to the circuit in which the capacitor is operated. Maximum variation in the capacitance of the four-set configuration is achieved with a 45° rotation of the movable group. Thus, the capacitive response of the invention can be adapted to meet specific criteria by varying the numbers of plates, sets, and electroconductive areas. Generally, the amount of rotation necessary to effect a full range of capacitive variation is inversely related to the number of electroconductive areas provided.

EXAMPLE

Figure 7:
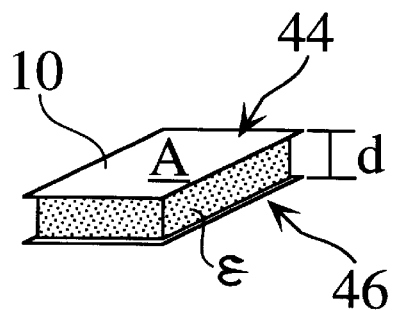
FIG. 7 is a schematic view of a prior art capacitor.

FIG. 7 is a schematic view of a prior art capacitor 10. The capacitance between two spaced parallel plates 44, 46 can be calculated using the formula:

$$C = \frac{\varepsilon A}{d} \quad (1)$$

where:
A is the area of the plate;
d is the distance between plates;
$\varepsilon$ is the constant for the permittivity of air; and
C is the capacitance.

A sample calculation using the following assumed data illustrates the total capacitance achieved by the prior art design.

$$\varepsilon = 8.859 \times pF/m \quad (2)$$

where:
A=4.525 in²;
d=0.032 in; and
C=31.819 pF.

FIGS. 8a–8d are a series of schematic diagrams showing the calculation of capacitance for a variable capacitor according to the invention using the following data:
Voltage rating=1;
Outer diameter of Conductive Area, D=3.5 in.;
Inner diameter of nonconductive area, Di=0.5 in.;
Separation between conductive areas, S=0.125 in.;
Distance between plates, d=0.032 in.; and
Total conductive area per disk=

$$A = \pi\left(\frac{D}{2}\right)^2 - \pi\left(\frac{Di}{2}\right)^2 - (D - Di) \cdot S = 9.05 \text{ in}^2 \quad (3)$$

Figure 8A:
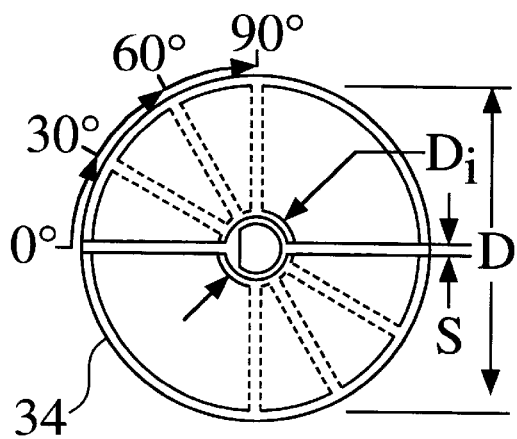
FIGS. 8a–8d are a series of schematic diagrams showing the calculation of capacitance for a variable capacitor according to the invention.
Figure 8B:
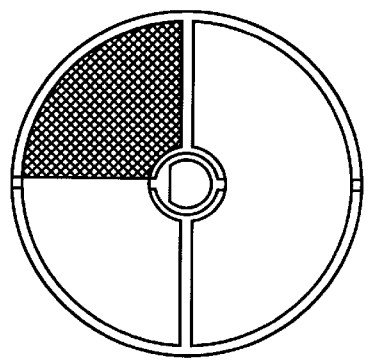

FIG. 8b is a schematic illustration of the capacitance for one-quarter of a movable plate according to the invention. The area of capacitance per one-quarter disk is, according to the sample data above, 9.05 in² divided by 4, or A=2.262 in².

The voltage rating is directly proportional to the spacing, d, between the plates, or Voltage rating=$V_R \cdot d$.

The capacitance is calculated between conductive areas on 2 disks at 90° of rotation (0°=conductive areas completely overlapping each other). Using the general capacitance formula, $$C = \frac{\varepsilon A}{d},$$

the capacitance equals 15.909 pF.

Figure 8C:
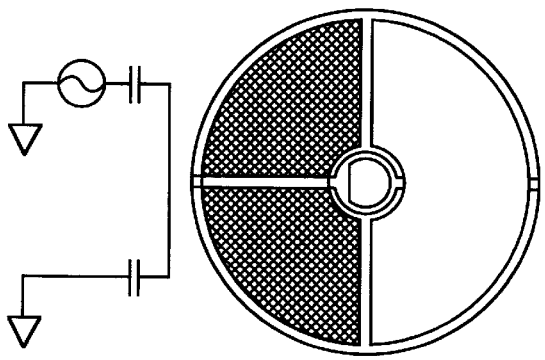
Figure 8D:
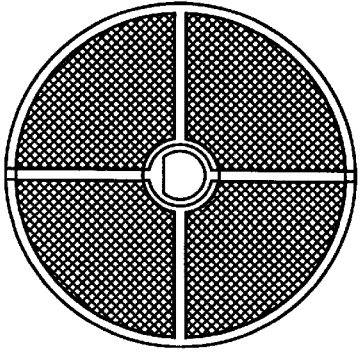

FIG. 8c illustrates the capacitance of a movable plate with two one-quarter electroconductive areas; and FIG. 8d illustrates the capacitance of a movable plate with four one-quarter electroconductive areas according to the invention.

FIG. 8c shows two capacitors in series, where the total capacitance is calculated according to the formula $$C_t = \frac{C \cdot C}{C + C} = 7.955 \text{ pF} \quad (6)$$

The Voltage rating equals:

$$V_{RATING} = V_R \cdot (d \cdot 2) \quad (5)$$

FIG. 8d shows that the equivalent two capacitor configuration of FIG. 8c for two overlapping movable plates, is equivalent to a single capacitance. Thus, the total capacitance is:

$$C = C_t + C_t = 15.909 \text{ pF} \quad (6)$$

By halving the space between the conductive areas, the voltage rating drops to the original value, and the capacitance doubles to the value of the conventional prior art capacitor. The invention therefore provides comparable capacitance and voltage rating as prior art designs in the same volume, while eliminating the wear related problems of prior art variable capacitors discussed above, and while providing full variation in capacitance with 90° or less rotation.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A variable capacitor, comprising:
   at least two coplanar, electroconductive members having at least one coplanar, dielectric member therebetween to electrically isolate said electroconductive members to form a capacitor plate;
   a fixed set of at least one of said capacitor plates, each electroconductive member of which is adapted to be separately electrically connected to an electrical circuit; and
   a movable group having at least one member comprising at least two coplanar electroconductive areas with at least one coplanar, dielectric area therebetween to electrically isolate said electroconductive areas, said movable group positioned to, and insulated from, said fixed set of capacitor plates, said movable group being adapted for rotation of 90° or less about an axis perpendicular to a surface plane of said first set of plates to vary an amount by which said electroconductive areas of said movable group overlap the surface plane of both of said coplanar, electrically electroconductive members of said fixed set of capacitor plates, to provide variable capacitive coupling therebetween, wherein full variation in capacitive coupling is provided with 90° or less rotation of said movable group about said axis.

2. The variable capacitor of claim 1, wherein said electroconductive members are supported on a base material.

3. The variable capacitor of claim 2, wherein said base material is about 2 millimeters thick.

4. The variable capacitor of claim 2, wherein said base material is polyimide.

5. The variable capacitor of claim 1, wherein said electroconductive members are made of copper.

6. The variable capacitor of claim 1, wherein said electroconductive members are between about 0.5 and 5 millimeters thick.

7. The variable capacitor of claim 1, wherein at least one of said fixed set of capacitor plates and said movable group are flexible.

8. The variable capacitor of claim 1, wherein at least one of said fixed set of capacitor plates and said movable group are rigid.

9. The variable capacitor of claim 1, wherein at least one of said electroconductive members is a copper/ceramic structure.

10. The variable capacitor of claim 1, wherein at least one of said electroconductive members is formed on plastic base.

11. The variable capacitor of claim 1, wherein at least one of said electroconductive members is formed on printed circuit board.

12. A variable capacitor, comprising:

at least two spaced plates adapted for connection to an electrical circuit, each of said plates having at least two coplanar, electroconductive members having at least one coplanar, dielectric member therebetween to electrically isolate said electroconductive members to form a capacitor plate;

at least one spaced movable electroconductive member comprising at least two coplanar electroconductive areas with at least one coplanar, dielectric area therebetween to electrically isolate said electroconductive areas, said movable electroconductive member being adapted for rotation of 90° or less about an axis perpendicular to a surface plane of said spaced plates to vary an amount by which said electroconductive areas of said movable member overlap the surface plane of each of said spaced plates, and thereby provide variable capacitive coupling between said spaced plates, wherein full variation in capacitive coupling is provided with 90° or less rotation of said movable group about said axis.

13. The variable capacitor of claim 12, further comprising:

a plurality of said spaced plates arranged as layers in a fixed stack; and a plurality of movable electroconductive members arranged in a movable stack and adapted to intermesh with said stack of spaced plates.

14. The variable capacitor of claim 13, wherein each plate of said spaced plates in each layer of said fixed stack is electrically connected to a corresponding plate in each other layer of said fixed stack.

15. The variable capacitor of claim 13, wherein each electroconductive member in each layer of said movable stack is electrically connected to a corresponding electroconductive member in each other layer of said movable stack.

16. The variable capacitor of claim 12, wherein said movable electroconductive member is not electrically connected to said spaced plates, nor is said movable electroconductive member adapted for connection to an electrical circuit.

17. The variable capacitor of claim 12, wherein there is an inverse relation between the number of spaced plates and corresponding movable electroconductive members and the maximum amount of rotation of said movable electroconductive members necessary to effect a full range of capacitive variation.

* * * * *